United States Patent [19]

Goodman

[11] Patent Number: 5,030,531
[45] Date of Patent: Jul. 9, 1991

[54] TRI-LEVEL XEROGRAPHIC TWO-COLOR FORMS PRINTER WITH SLIDE ATTACHMENT

[75] Inventor: Nancy B. Goodman, Penfield, N.Y.

[73] Assignee: Xerox Corporation, Stamford, Conn.

[21] Appl. No.: 504,203

[22] Filed: Apr. 4, 1990

[51] Int. Cl.$^5$ .................. G03G 13/01; G03G 13/00
[52] U.S. Cl. ....................................... 430/45; 430/42; 430/54
[58] Field of Search .................... 430/42, 45, 54

[56] References Cited

U.S. PATENT DOCUMENTS

| | | | |
|---|---|---|---|
| 4,078,929 | 3/1978 | Gundlach | 96/1.2 |
| 4,167,324 | 9/1979 | Wu | 355/3 R |
| 4,385,822 | 5/1983 | Kanbe | 355/3 R |
| 4,774,546 | 9/1988 | Corona et al. | 355/14 R |
| 4,920,024 | 4/1990 | Williams | 430/45 |

FOREIGN PATENT DOCUMENTS 8202297 1/1984 Netherlands ................... 430/54

OTHER PUBLICATIONS

Junzo Nakajima et al, POSI-Overlay Process for a copier-Printer, IAS Meeting 1980 pp. 1123-1127, ©1980 IEEE.

Primary Examiner—Marion E. McCamish
Assistant Examiner—S. Crossan

[57] ABSTRACT

Highlight color imaging apparatus wherein tri-level images are created by using a transparency with optical densities suitable for forming a bi-level image having relatively high and intermediate voltage levels. A modulated light source is then employed to form a third voltage level on the imaging surface by reducing the intermediate voltage level to a relatively low residual voltage level.

3 Claims, 2 Drawing Sheets

TRI-LEVEL XEROGRAPHIC TWO-COLOR FORMS PRINTER WITH SLIDE ATTACHMENT

BACKGROUND OF THE INVENTION

This invention relates generally to highlight color imaging and, more particularly, to the formation of tri-level images for this purpose.

The invention can be utilized in the art of xerography or in related printing arts. In the practice of conventional xerography, it is the general procedure to form electrostatic latent images on a xerographic surface by first uniformly charging a photoconductive insulating surface or photoreceptor. The charge is selectively dissipated in accordance with a pattern of activating radiation corresponding to original images. The selective dissipation of the charge leaves a latent charge pattern on the imaging surface corresponding to the areas not struck by radiation.

This charge pattern is made visible by developing it with toner. The toner is generally a colored powder which adheres to the charge pattern by electrostatic attraction.

The developed image is then fixed to the imaging surface or is transferred to a receiving substrate such as plain paper to which it is fixed by suitable fusing techniques.

Multi-color imaging has also been accomplished utilizing basic xerographic techniques. In this instance, the foregoing process is essentially repeated for three or four cycles. Thus, the charged photoconductive surface is successively exposed to filtered light images. After each exposure the resultant electrostatic latent image is then developed with toner particles corresponding in color to the subtractive primary of the filtered light image. For example, when a red filter is employed, the electrostatic latent image is developed with toner particles which are cyan in color. The cyan toner powder image is then transferred to the copy sheet. The foregoing process is repeated for a green filtered light image which is developed with magenta toner particles and a blue filtered light image which is developed with yellow toner particles.

Each differently colored toner powdered image is sequentially transferred to the copy sheet in superimposed registration with the powder image previously transferred thereto. In this way, three or more toner powder images are transferred sequentially to the copy sheet. After the toner powder images have been transferred to the copy sheet, they are permanently fused thereto. The foregoing color imaging process is known as full color imaging.

Another color imaging process is known as highlight color imaging. In highlight color imaging two or more different color developers are customarily employed, usually black and some other color or colors, for example, red and/or blue. In one type of highlight color imaging, a tri-level image is formed on the imaging surface utilizing a three level ROS (Raster Output Scanner) to form the tri-level image on a charge retentive surface that had previously been uniformly charged. The tri-level image comprises two image areas and a background area.

The concept of tri-level xerography is described in U.S. Pat. No. 4,078,929 issued in the name of Gundlach. The patent to Gundlach teaches the use of tri-level xerography as a means to achieve single-pass highlight color imaging. As disclosed therein, the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development system is biased to about the background voltage. Such biasing results in a developed image of improved color sharpness.

In tri-level xerography, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by charged area development, i.e. CAD) stays at the full photoreceptor potential ($V_{ddp}$ or $V_{cad}$, see FIGS. 1a and 1b). The other image is exposed to discharge the photoreceptor to its residual potential, i e. $V_c$ or $V_{dad}$ (typically 100 v) which corresponds to discharged area images that are subsequently developed by discharged-area development (DAD). The background areas are exposed such as to reduce the photoreceptor potential to halfway between the $V_{cad}$ and $V_{dad}$ potentials, (typically 500 v) and is referred to as $V_w$ or $V_{white}$. The CAD developer is typically biased about 100 v closer to $V_{cad}$ than $V_{white}$ (about 600 v), and the DAD developer system is biased about 100 v closer to $V_{dad}$ than $V_{white}$ (about 400 v).

Because the composite image developed on the charge retentive surface consists of both positive and negative toner a pre-transfer corona charging step is necessary to bring all the toner to a common polarity so it can be transferred using corona charge of the opposite polarity.

In conventional tri-level imaging, a three level raster output scanner (ROS) is utilized. It has three operating states (i.e. "off", "full on" and "white level" or "half power"). Two of the output levels or states (i.e. "full power" and "white level") of the three level ROS must be well controlled. As will be appreciated, a highlight color imaging system using a ROS which has to be well controlled at only one state (i.e. "full on"), particularly where the "full on" state is at a substantially lower power level than required in a conventional system is highly desirable.

Various other methods of forming composite images may be relevant to the present invention:

For example, U.S. Pat. No. 4,167,324 (Wu) issued Sept. 11, 1979 discloses a technique whereby a latent image of an original document is formed on a photoreceptor by a light lens system along a first optical path while a modulated light beam input is directed along a second optical path to the surface of a stratified stylus belt. The belt is placed in proximity to the photoreceptor and acts to provide a charge pattern on the previously formed latent image in conformity with the information in the modulated laser input.

Another method of forming such images is disclosed in U.S. Pat. No. 4,385,822 (Kanbo) issued May 31, 1983. As disclosed therein, an electromagnetic recording medium is used which enables formation of a first electrostatic latent image in one layer thereof, as well as a second, magnetic latent image in a second layer thereof. The formation of the two images are synchronized and the composite latent image is subsequently developed by a specially designed developing device.

Still another method is to utilize an ion writing station as described in IBM Technical Disclosure Bulletin, Vol. 22, No. 12, May 1980, pp. 5270–5271. For this technique, a latent electrostatic image of the original document is formed by a light/lens optical arrangement. At a downstream position an ion writing station deposits a selected charge pattern on an already discharged portion of the latent image. This charge pattern conforms to the information desired to be added to the original document image.

U.S. Pat. No. 4,774,546 issued in the name of Corona et al on Sept. 27, 1988 discloses an electrophotographic reproduction device which is capable of forming images of an original document modified by information added to or replacing information of the original. A latent image of the document is formed on a photosensitive surface and a portion of the image, in a first embodiment, is maintained at the original charge level. This fully charged section is subsequently discharged in an imagewise pattern by a compact annotator device. The annotator includes an illumination source, an addressable light modulator device such as a liquid crystal panel and a lens array for forming the modulated light pattern onto the photosensitive surface.

BRIEF SUMMARY OF THE INVENTION

In accordance with the present invention there is disclosed a method and apparatus for creating tri-level images utilizing a ROS and a light lens slide projector. A charge retentive member in the form of a photoreceptor belt which has a relatively high uniform charge $V_O$ thereon is exposed to a slide transparency. A flash exposure slide projector is used for this purpose. The slide transparency represents a form containing fixed information that is used to form a composite image on the charge retentive surface. Variable information is provided by a laser or raster output scanner (ROS).

The blank areas of the slide have optical densities such that when the illumination from a flash lamp is projected therethrough and focused on the charged surface the surface is selectively discharged to a voltage level, $V_w \sim V_O/2$. Variable information is then written on the surface with a laser strong enough to reduce the voltage level $V_w$ to a residual voltage level, $V_r$ in the desired areas. In this mode of operation, the laser has to be stable in only its "full on" state. In contrast, the use of a laser in conventional tri-level electrostatic imaging requires operational stability not only in the "full on" but at partial power or "white level" state. The laser in the instant invention only has to reduce the voltage level approximately 400 volts as opposed to the 800 volts required in conventional tri-level imaging. The software algorithms required for this kind of image formation are less complicated than those for conventional tri-level imaging.

DETAILED DESCRIPTION OF THE PREFERRED EMBODIMENT OF THE INVENTION

Figures 1A, 1B:
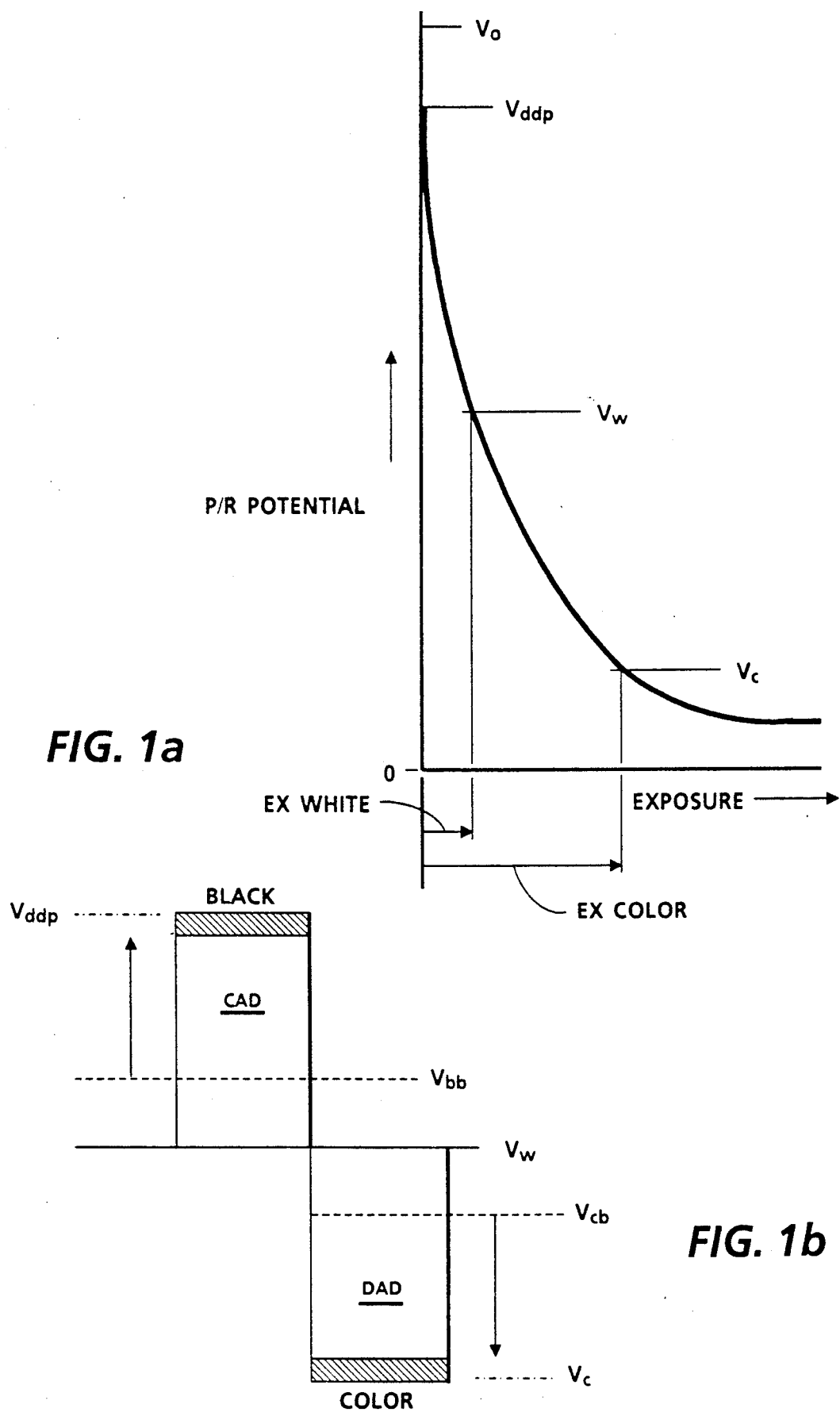
FIG. 1a is a plot of photoreceptor potential versus exposure illustrating a tri-level electrostatic latent image.
FIG. 1b is a graphical representation of a tri-level image and developer biases.

For a better understanding of the concept of tri-level, highlight color imaging, a description thereof will now be made with reference to FIGS. 1a and 1b. FIG. 1a illustrates a tri-level electrostatic latent image created using a three level Raster Output Scanner (ROS). Here $V_O$ is the initial charge level, $V_{ddp}$ the dark discharge potential corresponding to the "off" state of the ROS, $V_w$ the white discharge level corresponding to the "half power" state of the ROS and $V_c$ the photoreceptor residual potential corresponding to the "full on state of the ROS.

Color discrimination in the development of the electrostatic latent image is achieved when passing the photoreceptor through two developer housings in tandem or in a single pass by electrically biasing the housings to voltages which are offset from the background voltage $V_w$, the direction of offset depending on the polarity or sign of toner in the housing. One housing (for the sake of illustration, the second) contains developer with black toner having triboelectric properties such that the toner is driven to the most highly charged ($V_{ddp}$) areas of the latent image by the electrostatic field between the photoreceptor and the development rolls biased at $V_{bb}$ (V black bias) as shown in FIG. 1b. Conversely, the triboelectric charge on the colored toner in the first housing is chosen so that the toner is urged towards parts of the latent image at residual potential, $V_c$ by the electrostatic field existing between the photoreceptor and the development rolls in the first housing at bias voltage $V_{cb}$ (V color bias). The polarities of the two toners could equally be reversed.

Figure 2:
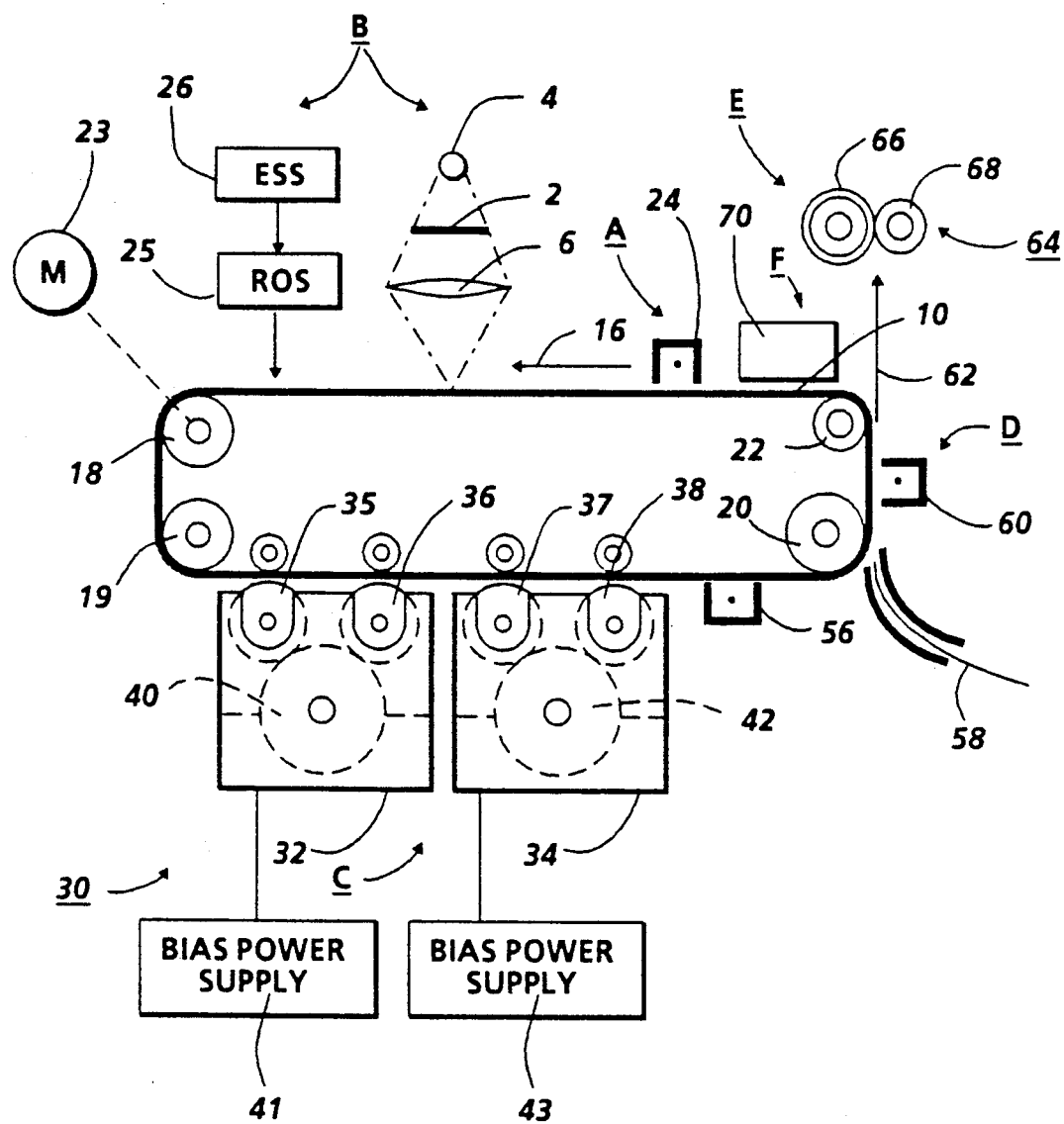
FIG. 2 is a schematic illustration of a printing apparatus incorporating the features of the invention.

As shown in FIG. 2, a printing machine incorporating the invention utilizes a charge retentive member in the form of a photoconductive belt 10 consisting of a photoconductive surface and an electrically conductive substrate and mounted for movement past a charging station A, an exposure station B, developer station C, transfer station D and cleaning station F. Belt 10 moves in the direction of arrow 16 to advance successive portions thereof sequentially through the various processing stations disposed about the path of movement thereof. Belt 10 is entrained about a plurality of rollers 18, 19, 20 and 22, being shown, the former of which can be used as a drive roller and the latter of which can be used to provide suitable tensioning of the photoreceptor belt 10. Motor 23 rotates roller 18 to advance belt 10 in the direction of arrow 16. Roller 18 is coupled to motor 23 by suitable means such as a belt drive.

As can be seen by further reference to FIG. 2, initially successive portions of belt 10 pass through charging station A. At charging station A, a corona discharge device such as a scorotron, corotron or dicorotron indicated generally by the reference numeral 24, charges the belt 10 to a selectively high uniform predetermined negative potential. Any suitable control, well known in the art, may be employed for controlling the corona discharge device 24.

Next, the uniformly charged portions of the photoreceptor surface are advanced through exposure station B. At exposure station B, the uniformly charged belt photoreceptor or charge retentive surface 10 is first exposed to a transparency 2 utilizing a transparency projector comprising a flash illumination source 4 and a lens 6.

The blank areas of the transparency have optical densities such that when the illumination from the flash lamp 4 is projected therethrough and focused on the charged surface the surface is selectively discharged to a voltage level, $V_w$ approximately $-500$ volts. The non-blank areas of the transparency represent fixed information such as a company logo or a form "overlay".

Variable information is then written on the surface with a ROS 25 controlled by an Electronic Subsystem (ESS) 26. The power output from the ROS is sufficient to reduce the voltage level $V_w$ to a residual voltage level, $V_c$ in the desired areas, $V_c$ being approximately equal to $-100$ volts. In this mode of operation, the laser has to be stable in only its "full on" state. In contrast, the use of a laser in conventional tri-level electrostatic imaging requires operational stability not only in the "full on" but at partial power or "white level" state. The laser in the instant invention only has to reduce the voltage level approximately 400 volts as opposed to the 800 volts required in conventional tri-level imaging. The software algorithms required for this kind of image formation are less complicated than those for conventional tri-level imaging.

At development station C, a magnetic brush development system, indicated generally by the reference numeral 30 advances developer materials into contact with the electrostatic latent images. The development system 30 comprises first and second developer housings 32 and 34. Preferably, each magnetic brush development housing includes a pair of magnetic brush developer rollers. Thus, the housing 32 contains a pair of rollers 35, 36 while the housing 34 contains a pair of magnetic brush rollers 37, 38. Each pair of rollers advances its respective developer material into contact with the latent image. Appropriate developer biasing is accomplished via power supplies 41 and 43 electrically connected to respective developer housings 32 and 34.

Color discrimination in the development of the electrostatic latent image is achieved by passing the photoreceptor past the two developer housings 32 and 34 in a single pass with the magnetic brush rolls 35, 36, 37 and 38 electrically biased to voltages which are offset from the background voltage $V_w$, the direction of offset depending on the polarity of toner in the housing. One housing e.g. 32 (for the sake of illustration, the first) contains developer with black toner 40 having triboelectric properties such that the toner is driven to the most highly charged ($V_{ddp}$) areas of the latent image by the electrostatic field (development field) between the photoreceptor and the development rolls biased at $V_{bb}$ as shown in FIG. 1b. Conversely, the triboelectric charge on colored toner 42 in the second housing is chosen so that the toner is urged towards parts of the latent image at residual potential, $V_c$ by the electrostatic field (development field) existing between the photoreceptor and the development rolls in the second housing at bias voltages $V_{cb}$.

In tri-level xerography, the entire photoreceptor voltage difference ($|V_{ddp}-V_c|$, as shown in FIG. 1a) is shared equally between the charged area development (CAD) and the discharged area development (DAD). This corresponds to $\approx 800$ volts (if a realistic photoreceptor value for $V_{ddp}$ of 900 volts and a residual discharge voltage of 100 volts are assumed). Allowing an additional 100 volts for the cleaning field in each development housing ($|V_{bb}-V_{white}|$ or $|V_{white}-V_{cb}|$) means an actual development contrast voltage for CAD of $\approx 300$ volts and an $\approx$ equal amount for DAD. In the foregoing case the 300 volts of contrast voltage is provided by electrically biasing the first developer housing to a voltage level of approximately 600 volts and the second developer housing to a voltage level of 400 volts.

Because the composite image developed on the photoreceptor consists of both positive and negative toner, a pre-transfer corona discharge member 56 using corona discharge are provided to condition the toner for effective transfer to a substrate.

A sheet of support material 58 (FIG. 2) is moved into contact with the toner image at transfer station D. The sheet of support material is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from stack into a chute which directs the advancing sheet of support material into contact with photoconductive surface of belt 10 in a timed sequence so that the toner powder images developed thereon contact the advancing sheet of support material at transfer station D.

Transfer station D includes a corona generating device 60 which sprays ions of a suitable polarity onto the backside of sheet 58. This attracts the charged toner powder images from the belt 10 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68 with the toner powder image contacting fuser roller 68. In this manner, the toner powder image is permanently affixed to sheet 58. After fusing, a chute, not shown, guides the advancing sheet 58 to a catch tray, also not shown, for subsequent removal from the printing machine by the operator.

After the sheet of support material is separated from photoconductive surface of belt 10, the residual toner particles carried by photoconductive surface are removed therefrom. These particles are removed at cleaning station F. A cleaner housing 70 is disposed at the cleaner station F.

Subsequent to cleaning, a discharge lamp (not shown) floods the photoconductive surface with light to dissipate any residual electrostatic charge remaining prior to the charging thereof for the successive imaging cycle.

I claim:

1. A method of forming tri-level latent electrostatic images comprising CAD and DAD image areas and a background area intermediate said CAD and DAD image areas, said method including the steps of:

uniformly charging a charge retentive surface;
projecting light through a transparency in order to form one of said image areas; and
using a raster output scanner, forming the other of said image areas.

2. The method according to claim 1 wherein the step of forming one of said images comprises forming said CAD image area and simultaneously forming said background area.

3. The method according to claim 2 wherein the step of forming said other image area comprises forming said DAD image area out of said background area.

* * * * *